United States Patent
Lim et al.

(10) Patent No.: US 9,014,133 B2
(45) Date of Patent: *Apr. 21, 2015

(54) METHOD OF REDUCING TRANSMISSION POWER AND TERMINAL THEREOF

(71) Applicant: LG Electronics Inc., Seoul (KR)

(72) Inventors: Suhwan Lim, Anyang (KR); Manyoung Jung, Anyang (KR); Yoonoh Yang, Anyang (KR); Sangwook Lee, Anyang (KR)

(73) Assignee: LG Electronics, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/527,619

(22) Filed: Oct. 29, 2014

(65) Prior Publication Data

US 2015/0063266 A1    Mar. 5, 2015

Related U.S. Application Data

(63) Continuation of application No. 13/543,548, filed on Jul. 6, 2012, now Pat. No. 8,879,493.

(60) Provisional application No. 61/568,150, filed on Dec. 7, 2011, provisional application No. 61/579,639, filed on Dec. 22, 2011, provisional application No. 61/591,277, filed on Jan. 27, 2012.

(30) Foreign Application Priority Data

Feb. 22, 2012    (KR) ........................ 10-2012-0018182

(51) Int. Cl.
*H04W 52/02*    (2009.01)
*H04W 52/36*    (2009.01)
*H04W 72/04*    (2009.01)

(52) U.S. Cl.
CPC ........ *H04W 52/367* (2013.01); *H04W 72/0453* (2013.01)

(58) Field of Classification Search
CPC ........................... H04L 7/007; H04L 27/2614
USPC .................................................. 370/329, 319
See application file for complete search history.

(56) References Cited

U.S. PATENT DOCUMENTS

| 2010/0255868 A1 | 10/2010 | Lee et al. |
| 2012/0231834 A1 | 9/2012 | Seo et al. |
| 2012/0327866 A1 | 12/2012 | Krishnamurthy et al. |

FOREIGN PATENT DOCUMENTS

KR    10-2011-0050329 A1    5/2011

*Primary Examiner* — Dang Ton
*Assistant Examiner* — Mewale Ambaye
(74) *Attorney, Agent, or Firm* — Birch, Stewart, Kolasch & Birch, LLP

(57) ABSTRACT

A method of reducing transmission power. The method is performed by a user equipment and includes calculating a maximum power reduction (MPR) on maximum output power for transmission with non-contiguous resource allocation in a single component carrier; and transmitting a signal based on the MPR. The MPR is determined according to the following equation: MPR=CEIL $\{M_A, 0.5\}$, the CEIL being a function of rounding up by 0.5. The $M_A$ is determined according to the following equations: $M_A=(8.0-10.12*A)$ when $0<A\leq0.33$, $M_A=(5.67-3.07*A)$ when $0.33<A\leq0.77$, and $M_A=(3.31)$ when $0.77<A\leq1.0$, the A being a ratio of a number of simultaneously transmitted resource blocks in a channel bandwidth to a number of aggregated resource blocks in a fully allocated aggregated channel bandwidth.

14 Claims, 20 Drawing Sheets

RELATED ART

Single component carrier (e.g. LTE system)

(a)

(b)

METHOD OF REDUCING TRANSMISSION POWER AND TERMINAL THEREOF

CROSS-REFERENCE TO RELATED APPLICATION

This application is a Continuation of copending application Ser. No. 13/543,548, filed on Jul. 6, 2012, which claims priority under 35 U.S.C. §119(e) to U.S. Provisional Application Nos. 61/568,150, filed on Dec. 7, 2011, 61/579,639 filed on Dec. 22, 2011 and 61/591,277 filed on Jan. 27, 2012 and under 35 U.S.C. §119(a) to Application No. 10-2012-0018182, filed in the Republic of Korea on Feb. 22, 2012, all of which are hereby expressly incorporated by reference into the present application.

BACKGROUND OF THE INVENTION

1. Field of the Invention

The present disclosure relates to a method of reducing transmission power and a terminal thereof.

2. Discussion of the Related Art

Recently, studies on a next-generation multimedia radio communication system have been actively conducted. The radio communication system requires a system that can process various information including images, radio data, etc. in lieu of services mainly using voice and transmit the information. The object of the radio communication system enables a plurality of users to perform reliable communication regardless of location and mobility. However, wireless channels suffer from several problems such as path loss, shadowing, fading, noise, limited bandwidth, power limitation of terminals and inter-user interference. Other challenges in the design of the radio communication system include resource allocation, mobility issues related to rapidly changing physical channels, portability and design for providing security and privacy.

When a transmission channel suffers from deep fading, if another version or replica of a signal transmitted to a receiver is not separately transmitted to the receiver, it is difficult for a receiver to determine the transmitted signal. A resource corresponding the separate version or replica is called as a diversity, and the diversity is one of the most important factors contributing to reliable transmission. If the transmission capacity or transmission reliability of data can be maximized using the diversity, and a system for implementing a diversity using multiple transmit and receive antennas is referred to as a multiple input multiple output (MIMO) system.

Techniques for implementing the diversity in the MIMO system are space frequency block code (SFBC), space time block code (STBC), cyclic delay diversity (CDD), frequency switched transmit diversity (FSTD), time switched transmit diversity (TSTD), precoding vector switching (PVS), spatial multiplexing (SM), etc.

Meanwhile, one of systems considered after the 3rd generation system is an orthogonal frequency division multiplexing (OFDM) system capable of reducing an inter-symbol interference effect with low complexity. The OFDM system converts serially input data into N parallel data and transmits the N parallel data respectively carried by N orthogonal subcarriers. The subcarrier maintains orthogonality in terms of frequencies. Orthogonal frequency division multiple access (OFDMA) refers to Orthogonal Frequency Division Multiple Access (OFDMA) refers to a multiple access method of realizing multi-access by independently providing users with some of available subcarriers in a system using OFDM as a modulation method.

FIG. 1 illustrates a radio communication system.

Referring to FIG. 1, the radio communication system includes at least one base station (BS) 20. Each of the BSs 20 provides a communication service for a specific terrestrial area (generally, referred to as a cell) 20a, 20b or 20c. The cell may be divided into a plurality of areas (also referred to as sectors). A user equipment (UE) 10 may be fixed or have mobility. The UE 10 may be called as other terms including a mobile station (MS), a subscriber station (SS), a wireless device, a personal digital assistant (PDA), a wireless modem, a handheld device, etc. The BS 20 generally refers to a fixed station communicating with the UEs 10, and may be called as other turns including an evolved-NodeB (eNB), a base transceiver system, an access point, etc.

Hereinafter, downlink (DL) means communication from a BS to a UE, and uplink (UL) means communication from a UE to a BS. In the DL, a transmitter may be a portion of the BS and a receiver may be a portion of the UE. In the UL, a transmitter may be a portion of the UE and a receiver may be a portion of the BS.

The radio communication system may be any one of a multiple input multiple output (MIMO) system, a multiple input single output (MISO) system, a single input single output (SISO) system and a single input multiple output (SIMO) system. The MIMO system uses a plurality of transmit antennas and a plurality of receive antenna. The MISO system uses a plurality of transmit antennas and one receive antenna. The SISO system uses one transmit antenna and one receive antenna. The SIMO system uses one transmit antenna and a plurality of receive antennas.

Hereinafter, the transmit antenna means a physical or logical antenna used to transmit one signal or stream, and the receive antenna means a physical or logical antenna used to receive one signal or stream.

Meanwhile, a long term evolution (LTE) system defined by 3rd generation partnership project (3GPP) employs the MIMO. Hereinafter, the LTE system will be described in detail.

FIG. 2 illustrates a structure of a radio frame in 3GPP LTE.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

FIG. 3 is an exemplary view illustrating a resource grid for one UL slot in the 3GPP LTE.

Referring to FIG. 3, the UL slot includes a plurality of OFDM symbols in a time domain, and includes $N^{UL}$ resource blocks (RBs) in a frequency domain. The OFDM symbol is used to represent one symbol period, may be called as an SC-FDMA symbol, OFDMA symbol or symbol period depending on a system. The BS includes a plurality of subcarriers in the frequency domain as a resource allocation unit. The number $N^{UL}$ of RBs included in the UL slot depends on the UL transmission bandwidth configured in a cell. Each element on a resource grid is referred to as a resource element.

Although it has been illustrated in FIG. 3 that one RB includes a 712 resource element composed of 7 OFDM symbols in the time domain and 12 subcarriers in the frequency domain, the number of subcarriers and the number of OFDM symbols in the RB are not limited thereto. The number of OFDM symbols and the number of subcarriers in the RB may be variously changed. The number of OFDM symbols may be changed depending on the length of a cyclic prefix (CP). For example, the number of OFDM symbols in a normal CP is 7, and the number of OFDM symbols in an extended CP is 6.

The resource grid for one UL slot in the 3GPP LTE of FIG. 3 may be applied to the resource grid for one DL slot.

FIG. 4 illustrates a structure of a DL subframe.

The DL subframe includes two slots in the time domain, and each of the slots includes seven OFDM symbols in the normal CP. Maximum three OFDM symbols (maximum four OFDM symbols for a bandwidth of 1.4 MHz) prior to a first slot in the subframe become a control region to which control channels are allocated, and the other OFDM symbols become a data region to which a downlink shared channel (PDSCH) is allocated. The PDSCH means a channel through which a BS transmits data to a UE.

A physical downlink control channel (PDCCH) may carry resource allocation (also referred to as DL grant) and transmission format on a downlink-shared channel (DL-SCH), resource allocation information (also referred to as UL grant) on a uplink-shared channel (UL-SCH), paging information on a paging channel (PCH), system information on the DL-SCH, resource allocation of an upper layer control message such as a random access response transmitted on the PDSCH, a set of transmission power control (TPC) for individual UEs in a UE group, activation of a voice over Internet protocol (VoIP), etc. The control information transmitted through the PDCCH as described above is referred as downlink control information (DCI).

FIG. 5 illustrates an example of the structure of the uplink subframe in the 3GPP LTE.

Referring to FIG. 5, the uplink subframe may be divided into a control region in which a physical uplink control channel (PUCCH) carrying uplink control information is allocated and a data region in which a physical uplink shared channel (PUSCH) carrying uplink data information is allocated. To maintain a single carrier property, RSs allocated to one UE are contiguous in the frequency domain. The one UE cannot transmit the PUCCH and the PUSCH at the same time.

The PUCCH for one UE is allocated as an RB pair in a subframe. RBs constituting the RB pair occupy different subcarriers in first and second slots, respectively. The frequency occupied by each of the RBs constituting the RB pair is changed at a boundary between the slots. The UE transmits uplink control information through different subcarriers according to time, thereby obtaining a frequency diversity gain.

The uplink control information transmitted on the PUCCH includes hybrid automatic repeat request (HARQ) acknowledgement (ACK)/negative acknowledgement (NACK), channel quality indicator indicating a downlink channel state, scheduling request (SR) that is an uplink radio resource allocation request, etc.

The PUSCH is mapped to the UL-SCH that is a transport channel. Uplink data transmitted on the PUSCH may be a transport block that is a data block for the UL-SCH transmitted for the TTI. The transport block may be user information, or the uplink data may be multiplexed data. The multiplexed data may be data obtained by multiplexing the transport block for the UL-SCH and control information. For example, the control information multiplexed by the data may include CQI, PMI, HARQ ACK/NACK, RI, etc. The uplink data may be composed of only the control information.

Meanwhile, a high data transmission rate is required, and the most general and stable plan for solving the high data transmission rate is to increase a bandwidth.

However, frequency resources are currently in a saturation state, various technologies are partially used in a wide frequency band. For this reason, carrier aggregation (CA) has been introduced as a plan for securing a wideband bandwidth in order to satisfy the requirement of the high data transmission rate. Here, the CA is a concept of designing to satisfy general requirements that an independence system is operable in each of the scattered bands and binding a plurality of bands using one system. In the CA, the band in which the independent system is operable is defined as a component carrier (CC).

The CA is employed not only in the LTE system but also in the LTE-advanced (hereinafter, referred to as an 'LTE-A') system.

Carrier Aggregation

A carrier aggregation system refers to a system that forms a wide band by aggregating one or more carriers having a bandwidth narrower than a desired wideband when a radio communication system intends to support the wideband. The carrier aggregation system may be called as other terms including a multiple carrier system, a bandwidth aggregation system, etc. The carrier aggregation system may be divided into a contiguous carrier aggregation system in which carriers are contiguous and a non-contiguous carrier aggregation system in which carriers are separated from one another. Hereinafter, when the carrier aggregation system is simply called as a multiple carrier system or carrier aggregation system, it should be understood that the carrier aggregation system includes both cases in which component carriers are contiguous and in which component carriers are non-contiguous.

In the contiguous carrier aggregation system, a guard band may exist between carriers. When one or more carriers are aggregated, the carriers to be aggregated may use the bandwidth used in a conventional system as it is for the purpose of backward compatibility with the conventional system. For example, the 3GPP LTE system supports bandwidths of 1.4 MHz, 3 MHz, 5 MHz, 10 MHz, 15 MHz and 20 MHz. Alternatively, the 3GPP LTE does not use the bandwidth used in the conventional system as it is but may form a wideband by defining a new bandwidth.

In the carrier aggregation system, the UE may simultaneously transmit or receive one or a plurality of carriers according to its capacity.

FIG. 6 illustrates an example of performing communication under a single component carrier situation. FIG. 6 may correspond to an example of performing communication in an LTE system.

Referring to FIG. 6, a general frequency division duplex (FDD) radio communication system transmits/receives data through one downlink band and one uplink band corresponding thereto. The BS and the UE transmits/receive data and/or control information scheduled as a subframe unit. The data is transmitted/received through the data region configured in the uplink/downlink subframe, and the control information is transmitted/received through the control region configured in the uplink/downlink subframe. To this end, the uplink/downlink subframe carries signals through various physical channels. Although the FDD radio communication system has been mainly described in FIG. 6, the aforementioned description may be applied to a time division duplex (TDD) radio communication system by dividing a radio frame into uplink/downlink radio frames in the time domain.

FIG. 7 illustrates an example of performing communication under a multiple component carrier situation. FIG. 7 may correspond to an example of performing communication in an LET-A system.

The LTE-A system uses a carrier aggregation or bandwidth aggregation using a wider uplink/downlink bandwidth by aggregating a plurality of uplink/downlink frequency blocks so as to use a wider frequency band. Each of the frequency blocks is transmitted using a component carrier (CC). In this specification, the CC may mean a frequency block for carrier aggregation or a central carrier of the frequency block according to the context, and the frequency block and the central carrier are used together.

On the other hand, the 3GPP LTE system supports a case in which the uplink/downlink bandwidths are configured differently, but supports one CC in each of the uplink/downlink bandwidths. The 3GPP LTE system supports a maximum bandwidth of 20 MHz, and supports only one CC in each of the uplink/downlink bandwidths. Here, the uplink/downlink bandwidths may be different from each other.

However, the spectrum aggregation (bandwidth aggregation or carrier aggregation) supports a plurality of CCs. For example, if five CCs are allocated as the granularity of a carrier unit having a bandwidth of 20 MHz, the spectrum aggregation can support a maximum bandwidth of 100 MHz.

A pair of DL CC or UL CC and DL CC may correspond to one cell. The one cell generalally includes one DL CC and optionally includes UL CC. Therefore, it may be considered that the UE communicating with the BS through a plurality of DL CCs receive services from a plurality of serving cells. The DL is composed of a plurality of DL CCs, but the UL may use only one CC. In this case, it may be considered that the UE receives services from a plurality of serving cells in the DL and receives a service from one serving cell in the UL.

In this meaning, the serving cell may be divided into a primary cell and a secondary cell. The primary cell operates at a primary frequency, and is used to perform an initial connection establishment process, connection re-establishment process or handover process of the UE. The primary cell is also referred to as a reference cell. The secondary cell operates at a secondary frequency, and may be configured after RRC connection is established. The secondary cell may be used to provide an additional radio resource. At least one primary cell is always configured, and the secondary cell may be added/modified/cancelled by upper layer signaling (e.g., an RRC message).

Referring to FIG. 7, five CCs having a bandwidth of 20 MHz may be aggregated in each of the UL/DL, thereby supporting a bandwidth of 100 MHz. CCs may be adjacent or non-adjacent to one another in the frequency domain. For convenience, FIG. 9 illustrates a case in which the bandwidths of UL and DL CCs are identical and symmetric to each other. However, the bandwidth of each of the CCs may be independently determined. For example, the bandwidth of the UL CC may be configured as 5 MHz (UL CC0)+20 MHz (UL CC1)+20 MHz (UL CC2)+20 MHz (UL CC3)+5 MHz (UL CC4). Asymmetric carrier aggregation may be implemented in which the number of UL CCs is different from that of DL CCs. The asymmetric carrier aggregation may be formed due to limitation of an available frequency band or may be artificially formed by network configuration. For example, although the frequency band of the entire system is composed of N CCs, the frequency band received by a specific UE may be limited to M(<N) CCs. Various parameters for the CA may be configured in a cell-specific, UE group-specific or UE-specific manner.

Although it has been illustrated in FIG. 7 that the UL and DL signals are respectively transmitted through CCs mapped one by one, the CC through which a signal is substantially transmitted may be changed depending on the network configuration or kind of signal.

For example, when a scheduling command is downlink-transmitted through the DL CC1, data according to the scheduling data may be transmitted through another DL CC or UL CC. Control information related on the DL CC may be uplink-transmitted through a specific UL CC regardless of the presence of mapping. Similarly, DL control information may also be transmitted through a specific DL CC.

FIG. 8 illustrates a usage example of Band 13 defined in the LTE system when the Band 13 is used in U.S.A. Here, the Band 13 refers to a frequency band having a DL bandwidth of 746 to 756 MHz and a UL bandwidth of 777 to 787 MHz.

Referring to FIG. 8, as the frequency policies for each country and for each region are separately established, there occurs a case where an adjacent frequency band of the frequency band used by terminals should be protected for each country and for each region. As can be seen in FIG. 8, a frequency band for public safety in an adjacent band of the Band 13, i.e., a public safety (PS) band is specified in U.S.A, and interface in the PS band, caused due to another system, is restricted to a certain numerical value or less.

However, if frequency bands in the LTE system are placed as shown in FIG. 8, and each UE transmits a signal using general power, the transmitted signal cannot satisfy requirements for emission specified in the corresponding country.

That is, if a signal is transmitted in the Band 13, unwanted emission occurs in an adjacent band. Therefore, the adjacent band is interfered due to the unwanted emission.

SUMMARY OF THE INVENTION

Therefore, an aspect of the detailed description is to provide a method of reducing transmission power and a terminal thereof, which can limit power for maximum transmit power.

Another aspect of the detailed description is to provide a method of reducing transmission power and a terminal thereof, which can limit power for maximum transmit power in carrier aggregation.

Still another aspect of the detailed description is to provide a method of reducing transmission power and a terminal thereof, which can limit power for maximum transmit power in a clustered discrete Fourier transform-spread-orthogonal frequency division multiplexing (DFT-s-OFDM) scheme.

To achieve these and other advantages and in accordance with the purpose of this specification, as embodied and broadly described herein, there is provided a method of reducing transmission power, the method including: performing maximum power reduction (MPR) on maximum output power for a signal to be transmitted, for multi-cluster transmission in a single component carrier; and transmitting the signal, wherein the MPR is performed differently depending on a resource allocation ratio A, wherein the resource allocation ratio A is defined as a ratio between $N_{RB\_agg}$ and $N_{RB\_alloc}$, and wherein the $N_{RB\_agg}$ represents the number of resource blocks (RBs) in a channel band, and the $N_{RB\_alloc}$ represents the total number of RBs transmitted at the same time.

The method may further include receiving information on an uplink resource allocated by a base station.

The uplink resource for transmission may belong to a specific class of an intra-band contiguous carrier aggregation (CA) band.

Additional adjacent channel leakage ratio (ACLR) and spurious emission (SE) through network signaling performed from the base station may not be defined with respect to the intra-band contiguous CA band.

The method may further include receiving system information from the base station.

The system information may contain at least one of information on an operating band, information on an uplink bandwidth and information on an uplink carrier frequency, and the information on the uplink bandwidth may contain information on the number of RBs.

When it is identified that the uplink resource for transmission belongs to the specific class of the intra-band contiguous CA band based on the system information, it may be determined that the additional ACLR and SE are not defined by the network signaling.

When it is identified that the uplink resource for transmission belongs to the specific class of the intra-band contiguous CA band based on the system information, it may be determined not to consider the additional ACLR and SE received through the network signaling.

The maximum output power for the signal to be transmitted may be defined according to the class of the intra-band contiguous CA band.

When the resource allocation ratio A is greater than 0 and smaller than or identical to 0.33, the MPR may be defined as (8.0–10.12*A) dB. When the resource allocation ratio A is greater than 0.33 and smaller than or identical to 0.77, the MPR may be defined as (5.67–3.07*A) dB. When the resource allocation ratio A is greater than 0.77 and smaller than or identical to 1.0, the MPR may be defined as 3.31 dB.

The value of MPR may be defined in consideration of ACLR of an adjacent channel for UTRA, ACRL of an adjacent channel for E-UTRA, general spectrum emission mask (SEM) and general SE. The value of MPR is a value required to simultaneously transmit a PUSCH and a PUCCH. Meanwhile, A-MPR may be further defined under a assumption of an additional unwanted emission. In general, the A-MPR is determined in consideration of an additional SEM and an additional SE, if a terminal transmit a signal in a specific operating band.

To achieve these and other advantages and in accordance with the purpose of this specification, as embodied and broadly described herein, there is provided a terminal including: a transmitter configured to transmit the signal, wherein the MPR is performed differently depending on a resource allocation ratio A, wherein the resource allocation ratio A is defined as a ratio between $N_{RB\_agg}$ and $N_{RB\_alloc}$, and wherein the $N_{RB\_agg}$ represents the number of RBs in a channel band, and the $N_{RB\_alloc}$ represents the total number of RBs transmitted at the same time, wherein the MPR is performed differently depending on a resource allocation ratio A, wherein the resource allocation ratio A is defined as a ratio between $N_{RB\_agg}$ and $N_{RB\_alloc}$, and wherein the $N_{RB\_agg}$ represents the number of RBs in a channel band, and the $N_{RB\_alloc}$ represents the total number of RBs transmitted at the same time.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
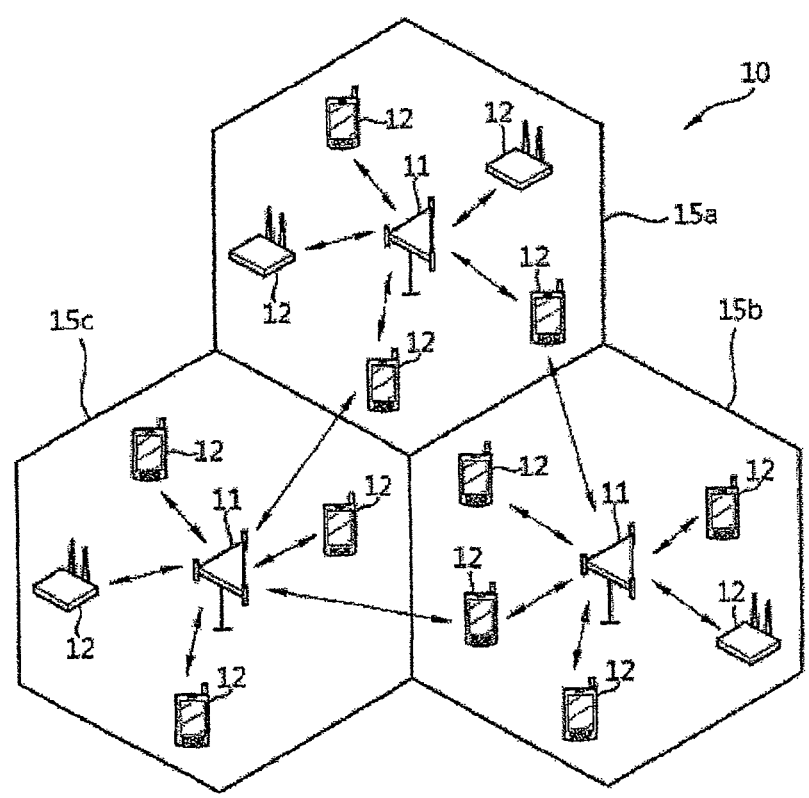
FIG. 1 illustrates a radio communication system.
Figure 2:
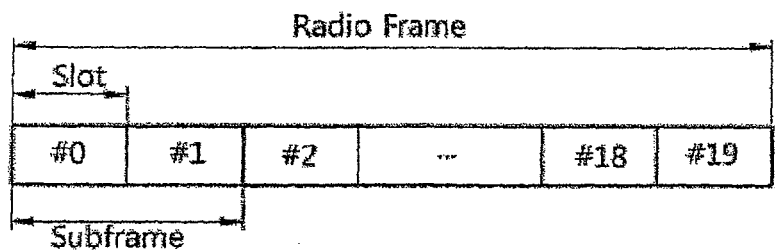
FIG. 2 illustrates a structure of a radio frame in 3rd generation partnership project long term evolution (3GPP LTE)
Figure 3:
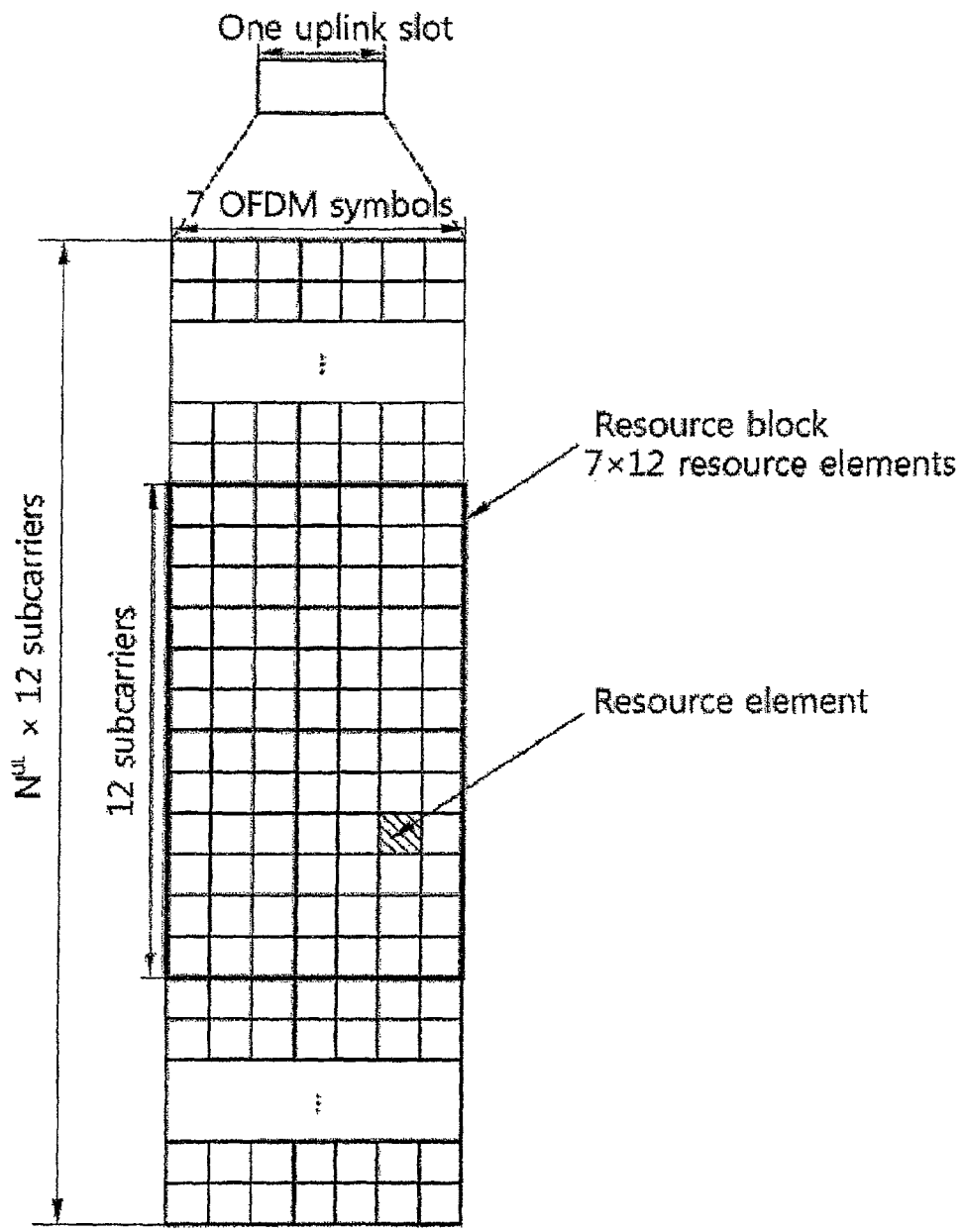
FIG. 3 is an exemplary view illustrating a resource grid for one uplink slot in the 3GPP LTE.
Figure 4:
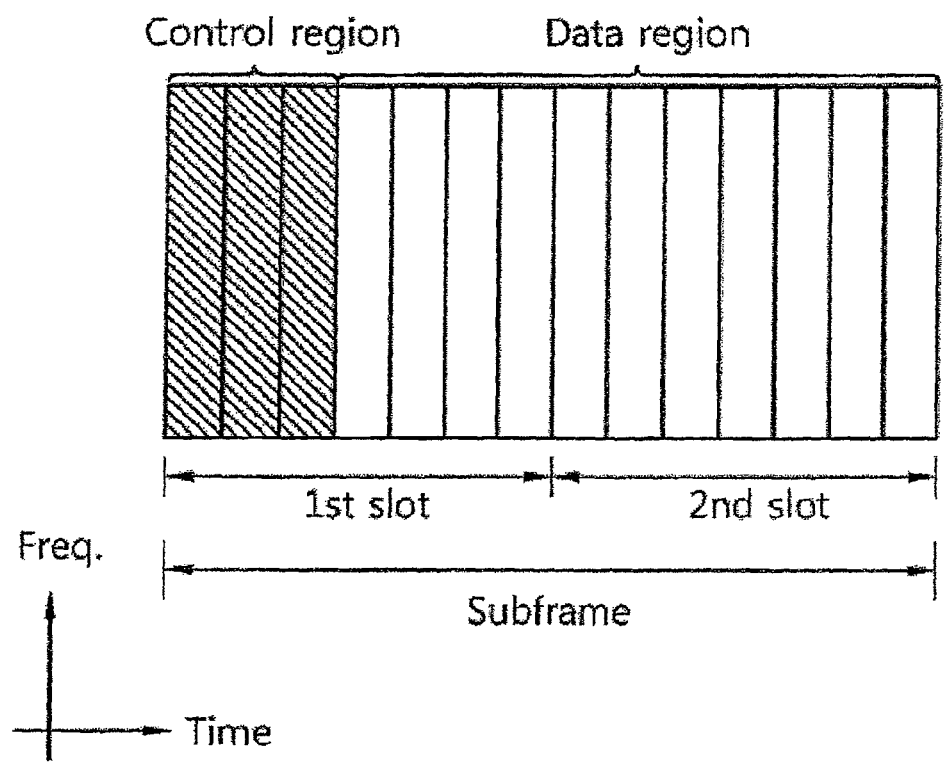
FIG. 4 illustrates a structure of a downlink subframe.
Figure 5:
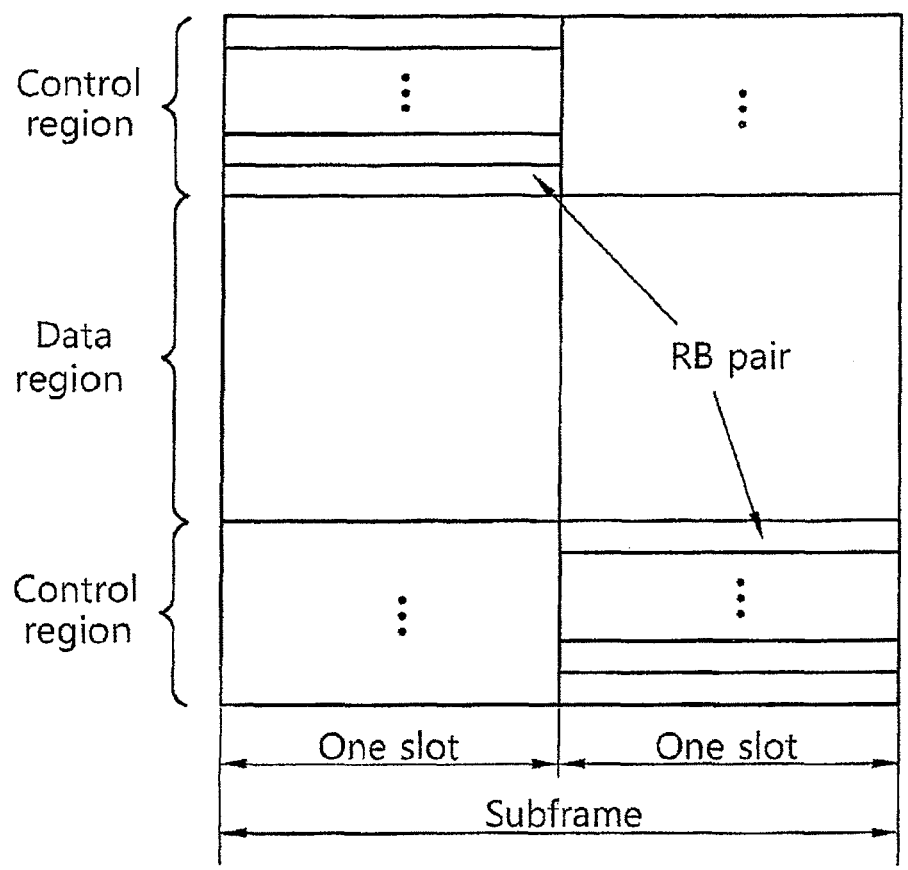
FIG. 5 illustrates an example of the structure of the uplink subframe in the 3GPP LTE.
Figure 5:
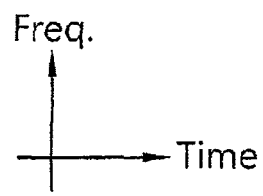
Figure 6:
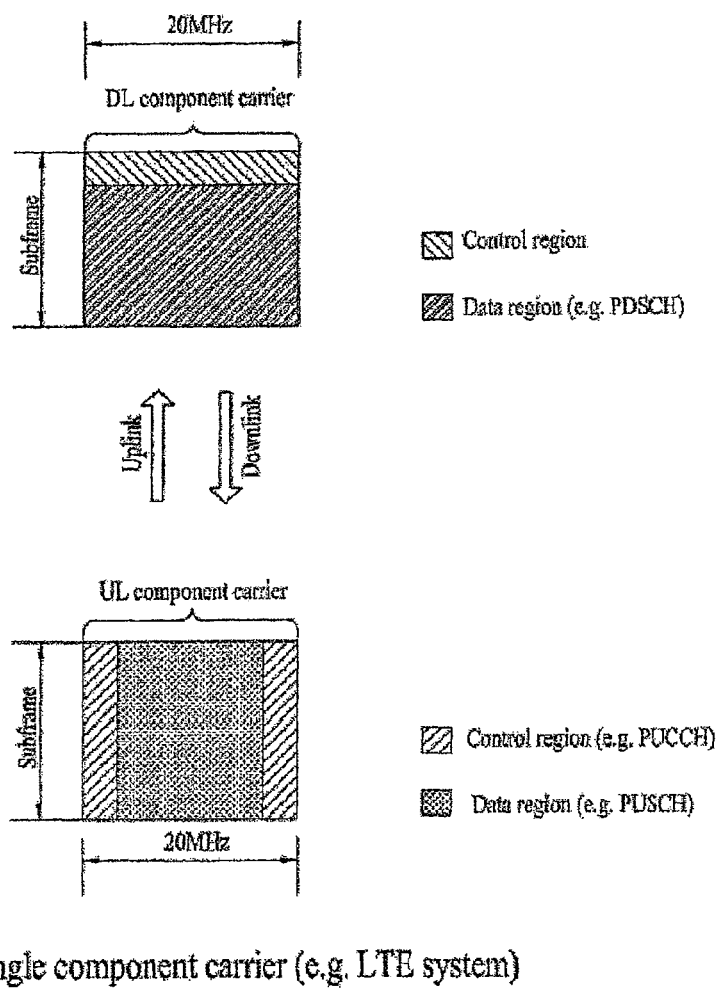
FIG. 6 illustrates an example of performing communication under a single component carrier situation.
Figure 7:
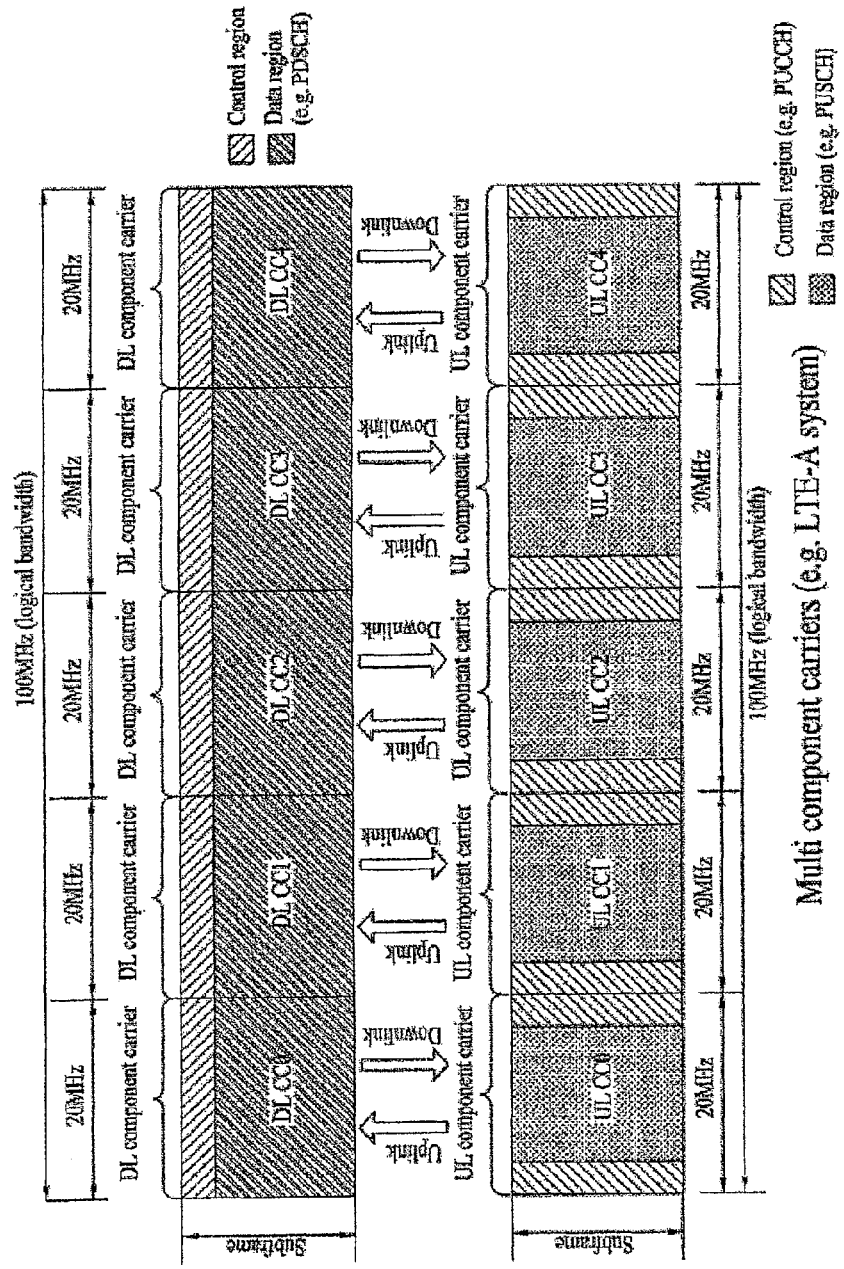
FIG. 7 illustrates an example of performing communication under a multiple component carrier situation.
Figure 8:
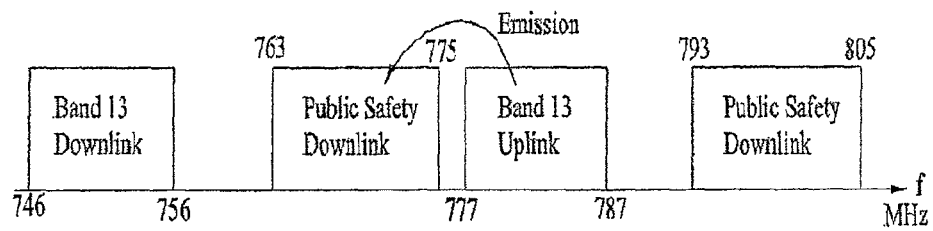
FIG. 8 illustrates a usage example of Band 13 defined in the LTE system when the Band 13 is used in U.S.A.

The following technology may be used in various multiple access schemes such as code division multiple access (CDMA), frequency division multiple access (FDMA), time division multiple access (TDMA), orthogonal frequency division multiple access (OFDMA) and single carrier-frequency division multiple access (SC-FDMA). The CDMA may be implemented by a radio technology such as universal terrestrial radio access (UTRA) or CDMA2000. The TDMA may be implemented by a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20 or evolved UTRA (E-UTRA). The UTRA is a portion of a universal mobile telecommunications system (UMTS). 3rd generation partnership project (3GPP) long term evolution (LTE) is a portion of an evolved UMTS (E-UMTS) using the E-UTRA, which employs the OFDMA in downlink and the SC-FDMA in uplink. LTE-advanced (LTE-A) is an evolution of the 3GPP LTE.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

The terminology used herein is for the purpose of describing particular embodiments only and is not intended to be limiting of the invention. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

It will be understood that, although the terms "first," "second," etc. may be used herein to describe various elements, these elements should not be limited by these terms. These terms are only used to distinguish one element from another element. Thus, a "first" element discussed below could also be termed as a "second" element without departing from the teachings of the present invention.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

In the drawings, the thickness of layers, films and regions are exaggerated for clarity. Like numerals refer to like elements throughout.

Description will now be given in detail of the exemplary embodiments, with reference to the accompanying drawings. For the sake of brief description with reference to the drawings, the same or equivalent components will be provided with the same reference numbers, and description thereof will not be repeated. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Hereinafter, although a terminal is shown in the drawings, the UE may be called as a user equipment (UE), mobile equipment (ME), mobile station (MS), user terminal (UT), subscriber station (SS), wireless device, handheld device or access terminal (AT). The UE may be a portable device having a communication function, such as a cellular phone, personal digital assistant (PDA), smart phone, wireless modem or notebook computer, or may be a device that cannot be carried, such as a personal computer (PC) or vehicle mounting device.

Figure 9:
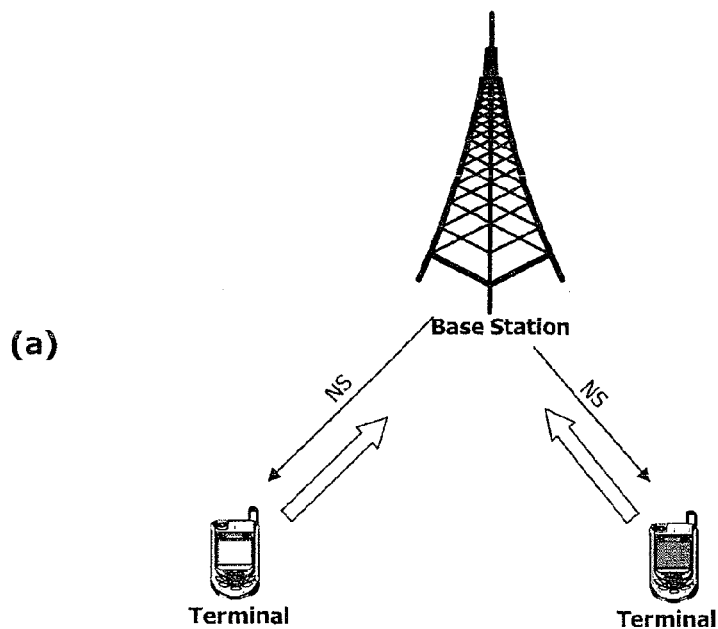
FIG. 9 is an exemplary diagram illustrating a method of limiting transmission power of a terminal.
Figure 9:
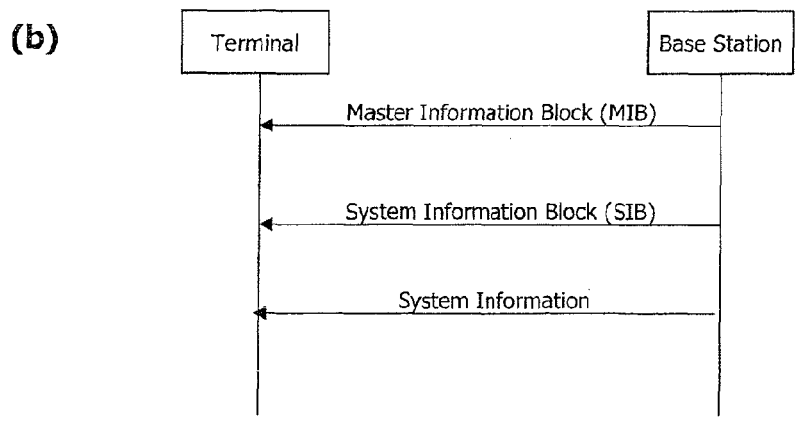
Figure 10:
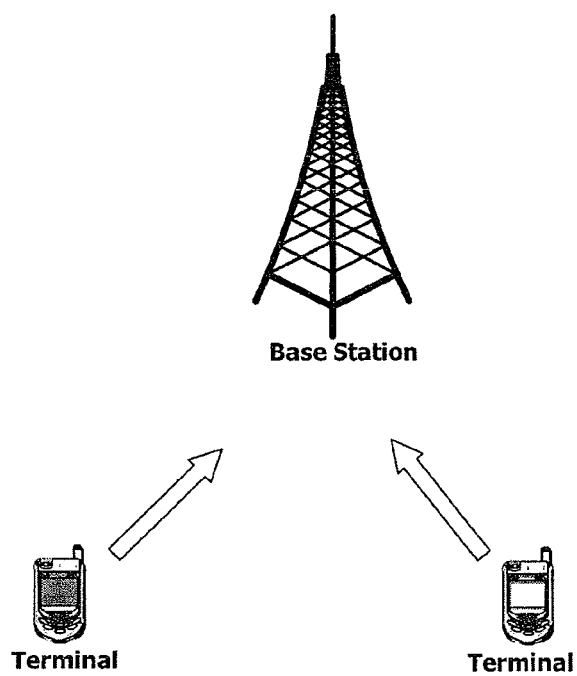
FIG. 10 is an exemplary diagram illustrating another method of limiting transmission power of a terminal.

FIG. 9 is an exemplary diagram illustrating a method of limiting transmission power of a terminal. FIG. 10 is an exemplary diagram illustrating another method of limiting transmission power of a terminal.

Before the method of limiting transmission power of a terminal is described with reference to FIG. 9, the maximum power actually available for the terminal in an LTE system is briefly expressed as follows.

$$Pc\,max = Min(Pe\,max, Pu\,max) \quad\quad \text{Expression 1}$$

Here, the Pcmax denotes maximum power (actual maximum transmit power) that the terminal can transmit to a corresponding cell, and the Pemax denotes maximum power available in a corresponding cell on which a base station (BS) performs signaling. The Pumax denotes the maximum power ($P_{PowerClass}$) of the terminal itself in consideration of maximum power reduction (hereinafter, referred to as MPR), additive-MPR (hereinafter, referred to as A-MPR), etc.

The maximum output power is changed depending on a channel band. In the case of intra-band carrier aggregation (CA), the operating band is defined as shown in the following table.

TABLE 1

| E-UTRA CA Band | E-UTRA Band | Uplink Operating Band RS Reception/UE Transmission $F_{UL\_low}$-$F_{UL\_high}$ | Downlink Operating Band BS Transmission/UE Reception $F_{DL\_low}$-$F_{DL\_high}$ | Duplex Mode |
|---|---|---|---|---|
| CA_1 | 1 | 1920 MHz-1980 MHz | 2110 MHz-2170 MHz | FDD |
| CA_40 | 40 | 2300 MHz-2400 MHz | 2300 MHz-2400 MHz | TDD |

In Table 1, the $F_{UL\_low}$ means the lowest frequency in the uplink operating band, and the $F_{UL\_high}$ means the highest frequency in the uplink operating band.

The FDD is an abbreviation for frequency division Duplex, and the TDD is an abbreviation for time division duplex.

Meanwhile, CA band classes and protection bands corresponding thereto are shown in the following table.

TABLE 2

| CA band class | Configuration of Aggregation Transmission Band | Maximum Number of Component Carriers | Protection Band $BW_{GB}$ |
|---|---|---|---|
| A | $N_{RB\_agg} \leq 100$ | 1 | $0.05BW_{Channel}$ |
| B | $N_{RB\_agg} \leq 100$ | 2 | Undecided (FFS: For Further Study) |
| C | $100 < N_{RB\_agg} \leq 200$ | 2 | 0.05 max |
| D | $200 < N_{RB\_agg} \leq [300]$ | Undecided (FFS: For Further Study) | Undecided (FFS: For Further Study) |
| E | $[300] < N_{RB\_agg} \leq [400]$ | Undecided (FFS: For Further Study) | Undecided (FFS: For Further Study) |
| F | $[400] < N_{RB\_agg} \leq [500]$ | Undecided (FFS: For Further Study) | Undecided (FFS: For Further Study) |

In Table 2, the square bracket [ ] is not surely specified yet, and may be changed. The $N_{RB\_agg}$ denotes the number of resource blocks (RBs) aggregated in an aggregation channel band.

In the channel band class C for the intra-band CA shown in Table 2, the maximum output power in an arbitrary transmission band may be defined as shown in the following table.

That is, if the channel band for the intra-band CA is defined as Class C, the maximum output power may be defined as shown in the following table.

TABLE 3

| EUTRA Band | Class 1 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| CA_1C  |  |  |  |  | 23 | +2/−2 |  |  |
| CA_40C |  |  |  |  | 23 | +2/[−2] |  |  |

In Table 3, the tolerance represents an allowable error. In Table 3, the square bracket [ ] is not surely specified yet, and may be changed. Here, the CA__1C means an operating band CA__1 in Table 1 in the class C, and the CA__40C means an operating band CA__40 in Table 1 in the class C.

The maximum output power described above expresses a value measured during the length (1 ms) of one subframe in an antenna of each UE.

In the current LTE system, the maximum power ($P_{PowerClass}$) of the terminal itself is defined as Power Class 3, which means power of 23 dBm.

Meanwhile, the MPR means the amount of power reduction for the maximum transmit power defined with respect to a specific modulation order or the number of RBs so as to satisfy RF requirements (a spectrum emission mask (SEM), an adjacent channel leakage ratio (ACLR), etc) defined in the standard. The A-MPR means the amount of power reduction for the maximum transmit power defined due to regional characteristics.

Thus, the maximum power of the terminal is additionally reduced by applying the A-MRP suitable for a situation, so that the transmission power of the terminal is induced to a level that satisfies requirements for a public safety (PS) band, specified in a corresponding country.

Referring to FIG. 9(a), the BS performs signaling on a network signaling (hereinafter, referred to as NS) value. Information element (hereinafter, referred to as IE) called as additional spectrum emission is defined in the protocol standard of the current LTE system, and 32 NSs is included in the IE. The value of A-MPR corresponding to each NS is defined in TS36.101 that is the 3GPP standard document. That is, each NS indicates the value of A-MPR corresponding thereto.

Then, the terminal transmits a signal by limiting its transmit power according to the corresponding value of A-MPR.

Specifically, if the terminal receives RBs for multi-cluster transmission in a single component carrier, which are allocated from the BS through its transceiver and then receives an NS value, the terminal transmits a signal by limiting the maximum transmit power according to the MPR indicated by the NS value.

Referring to FIG. 9(b), the BS transmits a master information block (MIB) and a system information block (SIB). The SIB may contain at least one of information on an operating band, information on an uplink (UL) bandwidth and information on a carrier frequency. The information on the UL bandwidth may contain information on the number of RBs.

The information on the operating band may contain information shown in the following table.

TABLE 4

| E-UTRA Operating Band | Uplink Operating Band $F_{UL\_low} - F_{UL\_high}$ | | Downlink Operating Band $F_{DL\_low} - F_{DL\_high}$ | | Duplex Mode |
|---|---|---|---|---|---|
| 1  | 1920 MHz — | 1980 MHz | 2110 MHz — | 2170 MHz | FDD |
| 2  | 1850 MHz — | 1910 MHz | 1930 MHz — | 1990 MHz | FDD |
| 3  | 1710 MHz — | 1785 MHz | 1805 MHz — | 1880 MHz | FDD |
| 4  | 1710 MHz — | 1755 MHz | 2110 MHz — | 2155 MHz | FDD |
| 5  | 824 MHz — | 849 MHz | 869 MHz — | 894 MHz | FDD |
| 6  | 830 MHz — | 840 MHz | 875 MHz — | 885 MHz | FDD |
| 7  | 2500 MHz — | 2570 MHz | 2620 MHz — | 2690 MHz | FDD |
| 8  | 880 MHz — | 915 MHz | 925 MHz — | 960 MHz | FDD |
| 9  | 1749.9 MHz — | 1784.9 MHz | 1844.9 MHz — | 1879.9 MHz | FDD |
| 10 | 1710 MHz — | 1770 MHz | 2110 MHz — | 2170 MHz | FDD |
| 11 | 1427.9 MHz — | 1447.9 MHz | 1475.9 MHz — | 1495.9 MHz | FDD |
| 12 | 699 MHz — | 716 MHz | 729 MHz — | 746 MHz | FDD |
| 13 | 777 MHz — | 787 MHz | 746 MHz — | 756 MHz | FDD |
| 14 | 788 MHz — | 798 MHz | 758 MHz — | 768 MHz | FDD |
| 15 | Reserved — |  | Reserved — |  | FDD |
| 16 | Reserved — |  | Reserved — |  | FDD |
| 17 | 704 MHz — | 716 MHz | 734 MHz — | 746 MHz | FDD |
| 18 | 815 MHz — | 830 MHz | 860 MHz — | 875 MHz | FDD |
| 19 | 830 MHz — | 845 MHz | 875 MHz — | 890 MHz | FDD |
| 20 | 832 MHz — | 862 MHz | 791 MHz — | 821 MHz | FDD |
| 21 | 1447.9 MHz — | 1462.9 MHz | 1495.9 MHz — | 1510.9 MHz | FDD |
| 22 | 3410 MHz — | 3490 MHz | 3510 MHz — | 3590 MHz | FDD |
| 23 | 2000 MHz — | 2020 MHz | 2180 MHz — | 2200 MHz | FDD |
| 24 | 1626.5 MHz — | 1660.5 MHz | 1525 MHz — | 1559 MHz | FDD |
| 25 | 1850 MHz — | 1915 MHz | 1930 MHz — | 1995 MHz | FDD |
| ... |  |  |  |  |  |
| 33 | 1900 MHz — | 1920 MHz | 1900 MHz — | 1920 MHz | TDD |
| 34 | 2010 MHz — | 2025 MHz | 2010 MHz — | 2025 MHz | TDD |
| 35 | 1850 MHz — | 1910 MHz | 1850 MHz — | 1910 MHz | TDD |
| 36 | 1930 MHz — | 1990 MHz | 1930 MHz — | 1990 MHz | TDD |
| 37 | 1910 MHz — | 1930 MHz | 1910 MHz — | 1930 MHz | TDD |

TABLE 4-continued

| E-UTRA Operating Band | Uplink Operating Band $F_{UL\_low} - F_{UL\_high}$ | | | | Downlink Operating Band $F_{DL\_low} - F_{DL\_high}$ | | | | Duplex Mode |
|---|---|---|---|---|---|---|---|---|---|
| 38 | 2570 | MHz | — | 2620 MHz | 2570 | MHz | — | 2620 MHz | TDD |
| 39 | 1880 | MHz | — | 1920 MHz | 1880 | MHz | — | 1920 MHz | TDD |
| 40 | 2300 | MHz | — | 2400 MHz | 2300 | MHz | — | 2400 MHz | TDD |
| 41 | 2496 | MHz | — | 2690 MHz | 2496 | MHz | — | 2690 MHz | TDD |
| 42 | 3400 | MHz | — | 3600 MHz | 3400 | MHz | — | 3600 MHz | TDD |
| 43 | 3600 | MHz | — | 3800 MHz | 3600 | MHz | — | 3800 MHz | TDD |

Here, the $F_{UL\_low}$ means the lowest frequency in the uplink operating band, and the $F_{UL\_high}$ means the highest frequency in the uplink operating band. The $F_{DL\_low}$ means the lowest frequency in the downlink operating band, and the $F_{DL\_high}$ means the highest frequency in the downlink operating band.

Meanwhile, the terminal can identify that the UL allocated to transmit a signal belongs to a specific class of the CA band classes in Table 2, using the system information (SI) described above. Then, the terminal may transmit the signal by limiting the maximum transmit power according to the MPR recognized by the terminal, without considering the A-MPR through the NS. That is, additional ACLR and SE received through the NS may not be considered.

As can be seen with reference to FIG. 10, the terminal may transmit the signal by limiting the maximum transmit power according to the MPR recognized by the terminal, without the NS performed from the BS. This means that when the UL resource allocated from the BS is a general operating band which does not requires the NS performed by the BS, the maximum transmit power may be limited according to the MPR recognized by the terminal.

Hereinafter, a single carrier-frequency division multiple access (SC-FDMA) transmission scheme and the MPR required in the SC-FDMA will be described.

SC-FDMA

Figure 11:
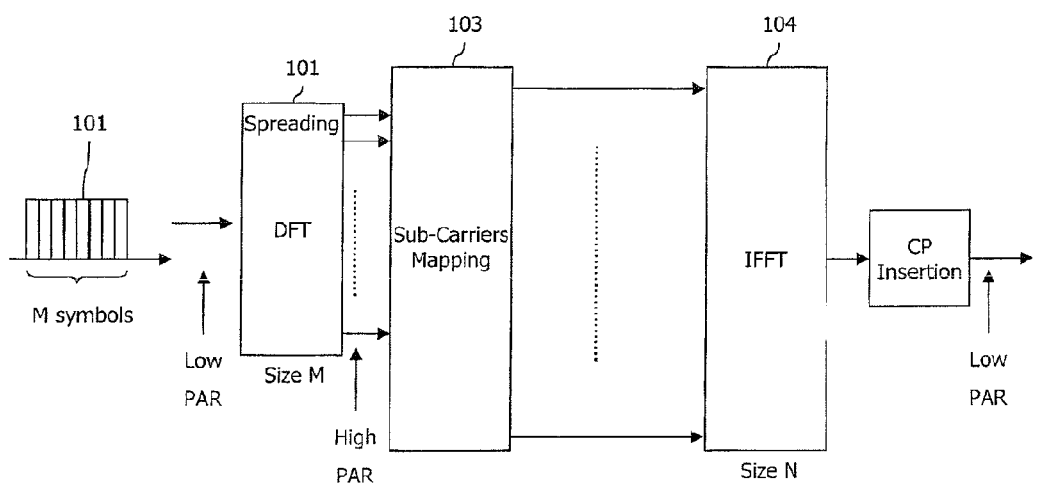
FIG. 11 is a block diagram illustrating a single carrier-frequency division multiple access (SC-FDMA) transmission scheme that is an uplink access scheme employed in the 3GPP LTE.

FIG. 11 is a block diagram illustrating an SC-FDMA transmission scheme that is an uplink access scheme employed in the 3GPP LTE.

SC-FDMA is employed in the uplink of LTE. Here, the SC-FDMA is a scheme similar to OFDM, but can reduce power consumption of a portable terminal and cost of a power amplifier by decreasing a peak to average power ratio (PAPR).

The SC-FDMA is a scheme similar to the OFDM in which a signal is divided into sub-bands to be transmitted through sub-carriers using fast Fourier transform (FFT) and inverse-FFT (IFFT). The SC-FDMA is identical to the conventional OFDM scheme in that a guard interval (cyclic prefix) is used so that it is possible to utilize a simple equalizer in the frequency domain with respect to inter-symbol interference (ISI). However, the power efficiency of a transmitter has been improved by decreasing the PAPR at a transmitter terminal by about 2 to 3 dB using an additional unique technique.

That is, the problem of the conventional OFDM receiver is that signals carried by each sub-carrier on a frequency axis are converted into signals on a time axis by the IFFT. Since parallel equal operations are performed in the IFFT, an increase in the PAPR occurs.

Referring to FIG. 11, to solve such a problem, a discrete Fourier transform (DFT) 12 is first performed on information before a signal is mapped to a sub-carrier in the SC-FDMA. Sub-carrier mapping 13 is performed on a signal spread (or precoded in the same meaning) by the DFT, and the signal subjected to the sub-carrier mapping is converted into a signal in the time axis by performing an IFFT 14.

In this case, unlike the OFDM, the PAPR of a signal in the time domain after the IFFT 14 is not increased so much by the correlation among the DEF 12, the sub-carrier mapping 13 and the IFFT 14, and thus the SC-FDMA is advantageous in terms of transmission power efficiency.

That is, a transmission scheme in which the IFFT is performed after DFT spreading is referred to as the SC-FDMA.

As such, the SC-FDMA has a similar structure to the OFDM, thereby obtaining the signal strength for a multi-path channel, and the SC-FDMA completely prevents the PAPR from being increased through the through the IFFT in the conventional OFDM, thereby enabling the use of a power amplifier. Meanwhile, the SC-FDMA may also be called as DEF spread OFDM (DEF-s-OFDM).

That is, the PAPR or cubic metric (CM) may be decreased in the SC-FDMA. When the SC-FDMA transmission scheme is used, it is possible to avoid a non-linear distortion period of the power amplifier, and thus the transmission power efficiency can be improved in an UE of which power consumption is limited. Accordingly, it is possible to increase a user throughput.

Meanwhile, the standardization of the LTE-A more improved than the LTE has been actively performed in the 3GPP. In the process of standardizing the LTE-A, the SC-FDMA-based scheme and the OFDM scheme competed with each other, but a clustered DEF-s-OFDM scheme that allows non-contiguous resource allocation has been employed.

Hereinafter, the LTE-A system will be described in detail.

Figure 12:
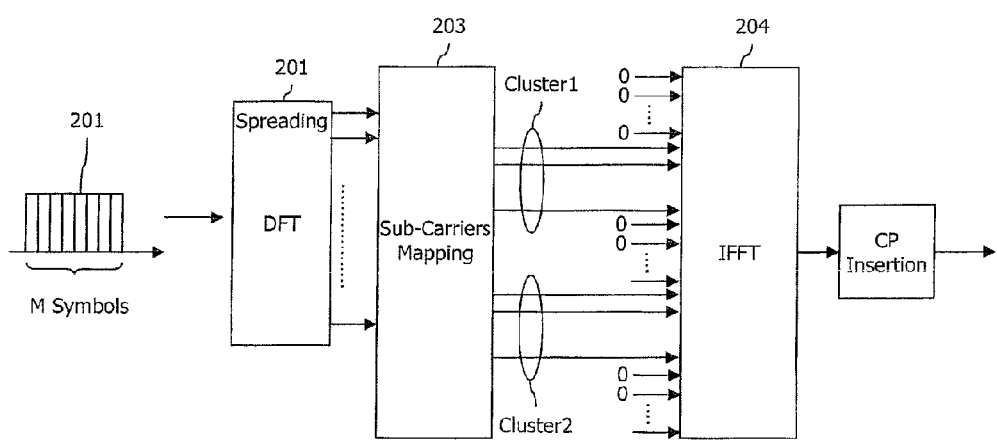
FIG. 12 is a block diagram a clustered discrete Fourier transform-spread-orthogonal frequency division multiplexing (DFT-s-OFDM) transmission method employed as an uplink access method in the LTE-advanced standard.

FIG. 12 is a block diagram a clustered discrete Fourier transform-spread-orthogonal frequency division multiplexing (DFT-s-OFDM) transmission method employed as an uplink access method in the LTE-advanced standard.

The important feature of the clustered DFT-s-OFDM is that it is possible to flexibly cope with a frequency selective fading environment by enabling frequency selective resource allocation.

In the clustered DFT-s-OFDM scheme employed as the uplink access scheme of the LTE-A, the non-contiguous resource allocation is allowed differently from the SC-FDMA that is an uplink access scheme of the conventional LTE, and thus transmitted uplink data can be divided into several cluster units.

That is, the LTE system maintains a single carrier characteristic in the UL. On the other hand, the LTE-A allows a case in which data subjected to DFT-precoding is non-contiguously allocated on the frequency axis or the PUSCH and PUCCH are transmitted at the same time. In this case, it is difficult to maintain the single carrier characteristic.

Figure 13:
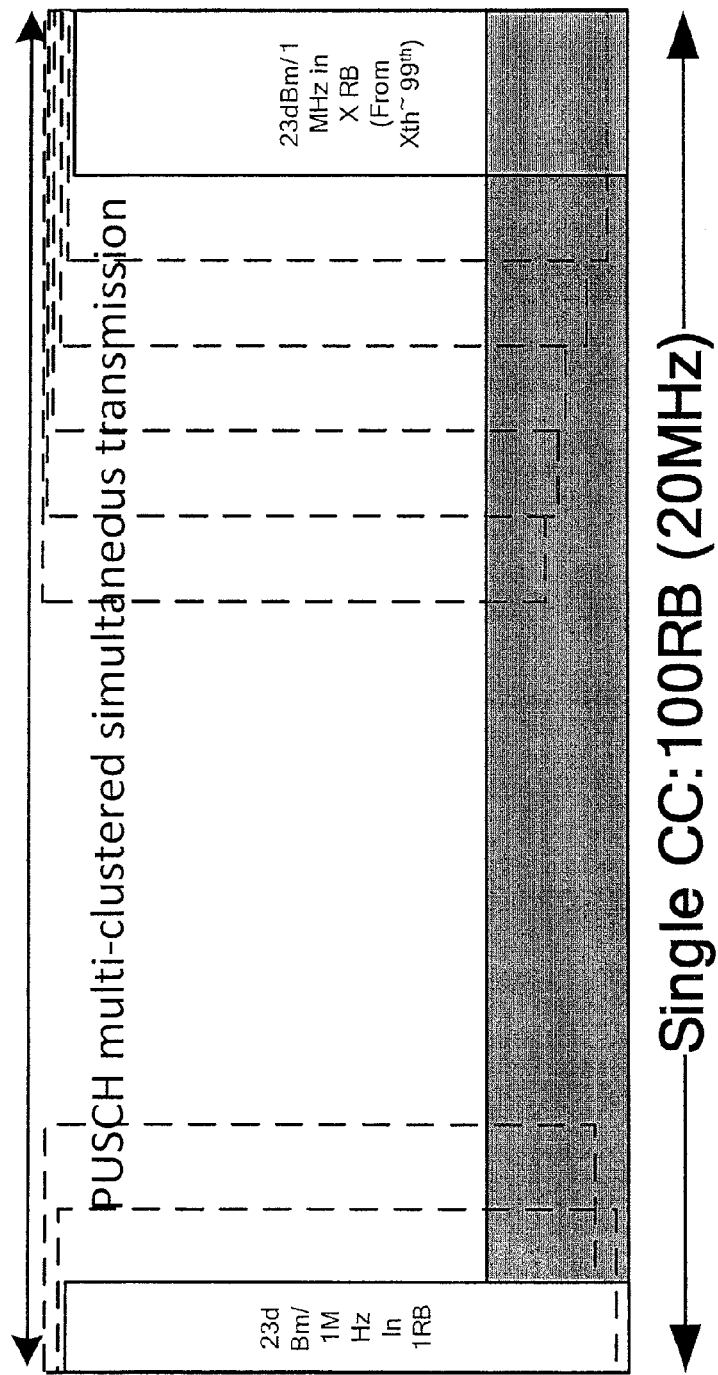
FIG. 13 illustrates a scenario in which a physical uplink shared channel (PUSCH) is transmitted by being divided into several cluster units in a single component carrier.
Figure 14:
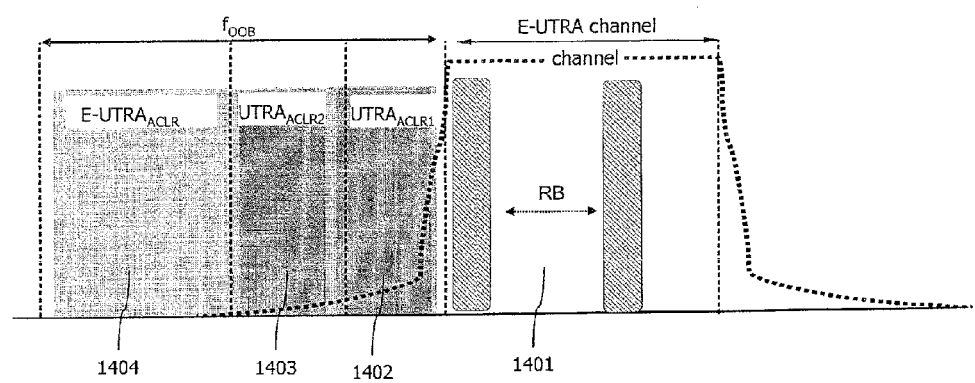
FIG. 14 illustrates an adjacent channel leakage ratio (ACLR)

FIG. 13 illustrates a scenario in which a PUSCH is transmitted by being divided into several cluster units in a single component carrier. FIG. 14 illustrates an adjacent channel leakage ratio (ACLR). FIGS. 15A to 15D illustrate simulations respectively obtained by using quadrature phase-shift keying (QPSK) and 16-quadrature amplitude modulation (QAM), and illustrate MPRs according to the simulations.

As can be seen with reference to FIG. 13, there is shown an example in which the PUSCH is transmitted by being allocated to several RBs when the single component carrier has 100 RBs, i.e., 20 MHz. The number and position of the allocated RBs are moved from the end to center of the frequency axis. In this case, the worst scenario is that the smallest number of RBs are allocated to both ends of the band.

First, before performing a simulation, parameters used in the simulation will be described.

The channel band uses a band compatible in 3GPP Release 8 and 9.
The modulation scheme is QPSK/16-QAM.
The modulator impairments are as follows.
I/Q imbalance: 25 dBc
Carrier leakage: 25 dBc
Counter IM3: 60 dBc Here, the I/Q imbalance is I/Q inequality, which means that the I/Q imbalance acts as spreading between symmetric subcarriers and causes performance degradation. In this case, the unit dBc represents the relative size of power based on the size in the power of a carrier frequency. The carrier leakage is an additional sinusoidal (sine) wave having the same frequency as a modulation carrier frequency. The counter IM3 (counter inter-modulation distortion) represents an element caused by components such as a mixer and an amplifier in an RF system.

ACLR requirements are defined as shown in the following table.

channel 1401, the $UTRA_{ACLR2}$ is a rate in which the signal is leaked to the adjacent channel 1403, i.e., UTRA channel. That is, the $UTRA_{ACLR2}$ is an ACLR. In a case where a channel 1404 positioned adjacent to the adjacent channel 1404 is used for the purpose of UTRA as shown in FIG. 14 when the terminal transmits a signal in the E-UTRA channel 1401, the $E\text{-}UTRA_{ACLR}$ is a rate in which the signal is leaked to the adjacent channel 1404, i.e., UTRA channel. That is, the $UTRA_{ACLR}$ is an ACLR.

The value of the MPR represents a general SEM that a frequency must not interfere when the channel is distant by a certain frequency distance from the outside of a given channel band. The value of MPR for Release 8 or 9 is defined as shown in the following table.

TABLE 6

Spectrum Emission Limit for Channel Band (dBm)

| $\Delta F_{OOB}$ (MHz) | 1.4 MHz | 3.0 MHz | 5 MHz | 10 MHz | 15 MHz | 20 MHz | Measurement Band |
|---|---|---|---|---|---|---|---|
| ±0-1 | −10 | −13 | −15 | −18 | −20 | −21 | 30 kHz |
| ±1-2.5 | −10 | −10 | −10 | −10 | −10 | −10 | 1 MHz |
| ±2.5-2.8 | −25 | −10 | −10 | −10 | −10 | −10 | 1 MHz |
| ±2.8-5 | | −10 | −10 | −10 | −10 | −10 | 1 MHz |
| ±5-6 | | −25 | −13 | −13 | −13 | −13 | 1 MHz |

TABLE 5

| | Channel Band (Measurement Band) | | | | | |
|---|---|---|---|---|---|---|
| | 1.4 MHz | 3.0 MHz | 5 MHz | 10 MHz | 15 MHz | 20 MHz |
| $UTRA_{ACLR1}$ | 33 dB | 33 dB | 33 dB | 33 dB | 33 dB | 33 dB |
| Adjacent Center Frequency Offset (MHz) | $+0.7 + BW_{UTRA}/2$ or $-0.7 - BW_{UTRA}/2$ | $+10 + BW_{UTRA}/2$ or $-1.5 - BW_{UTRA}/2$ | $+10 + BW_{UTRA}/2$ or $-2.5 - BW_{UTRA}/2$ | $+10 + BW_{UTRA}/2$ or $-5 - BW_{UTRA}/2$ | $+10 + BW_{UTRA}/2$ or $-7.5 - BW_{UTRA}/2$ | $+10 + BW_{UTRA}/2$ or $-10 - BW_{UTRA}/2$ |
| $UTRA_{ACLR2}$ | — | — | 36 dB | 36 dB | 36 dB | 36 dB |
| Adjacent Center Frequency Offset (MHz) | | | $+2.5 + 3*BW_{UTRA}/2$ or $-2.5 - 3*BW_{UTRA}/2$ | $+5 + 3*BW_{UTRA}/2$ or $-5 - 3*BW_{UTRA}/2$ | $+7.5 + 3*BW_{UTRA}/2$ or $-7.5 - 3*BW_{UTRA}/2$ | $+10 + 3*BW_{UTRA}/2$ or $-10 - 3*BW_{UTRA}/2$ |
| E-UTRA Channel Measurement Band | 1.08 MHz | 2.7 MHz | 4.5 MHz | 9.0 MHz | 13.5 MHz | 18 MHz |
| UTRA 5 MHz Channel Measurement Band | 3.84 MHz | 3.84 MHz | 3.84 MHz | 3.84 MHz | 3.84 MHz | 3.84 MHz |
| UTRA 1.6 MHz Channel Measurement Band | 1.28 MHz | 1.28 MHz | 1.28 MHz | 1.28 MHz | 1.28 MHz | 1.28 MHz |

In Table 5, the $BW_{UTRA}$ means a channel bandwidth for UTRA.

In Table 5, in a case where an adjacent channel 1402 is used for the purpose of UTRA as shown in FIG. 14 when the terminal transmits a signal in an E-UTRA channel 1401, the $UTRA_{ACLR1}$ is a rate in which the signal is leaked to the adjacent channel 1402, i.e., UTRA channel. That is, the $UTRA_{ACLR1}$ is an adjacent channel leakage rate (ACLR). In a case where a channel 1403 positioned adjacent to the adjacent channel 1402 is used for the purpose of UTRA as shown in FIG. 14 when the terminal transmits a signal in the E-UTRA TABLE 6-continued Spectrum Emission Limit for Channel Band (dBm)

| $\Delta F_{OOB}$ (MHz) | 1.4 MHz | 3.0 MHz | 5 MHz | 10 MHz | 15 MHz | 20 MHz | Measurement Band |
|---|---|---|---|---|---|---|---|
| ±6-10 | | | −25 | −13 | −13 | −13 | 1 MHz |
| ±10-15 | | | | −25 | −13 | −13 | 1 MHz |
| ±15-20 | | | | | −25 | −13 | 1 MHz |
| ±20-25 | | | | | | −25 | 1 MHz |

Here, the $\Delta F_{OOB}$ is an abbreviation for Frequency of Out Of Band emission, and represents a frequency when the frequency is emitted out of the channel band. The dBm is a unit of power (Watt), and 1 mW=0 dBm.

The general spurious emission (SE) that a frequency must not interfere according to the frequency range is defined as shown in the following table.

TABLE 7

| Frequency Band | Maximum Level | Measurement Band |
|---|---|---|
| 9 kHz ≤ f < 150 kHz | −36 dBm | 1 kHz |
| 150 kHz ≤ f < 30 MHz | −36 dBm | 10 kHz |
| 30 MHz ≤ f < 1000 MHz | −36 dBm | 100 kHz |
| 1 GHz ≤ f < 12.75 GHz | −30 dBm | 1 MHz |

Hereinafter, the result obtained by performing the simulations, based on the simulation parameters described above, will be described. In this case, based on the simulation result, the MPR required in the single component carrier is defined as NS_01, and the A-MPR required when other requirements additionally exist is defined as NS_XX.

Figure 15A:
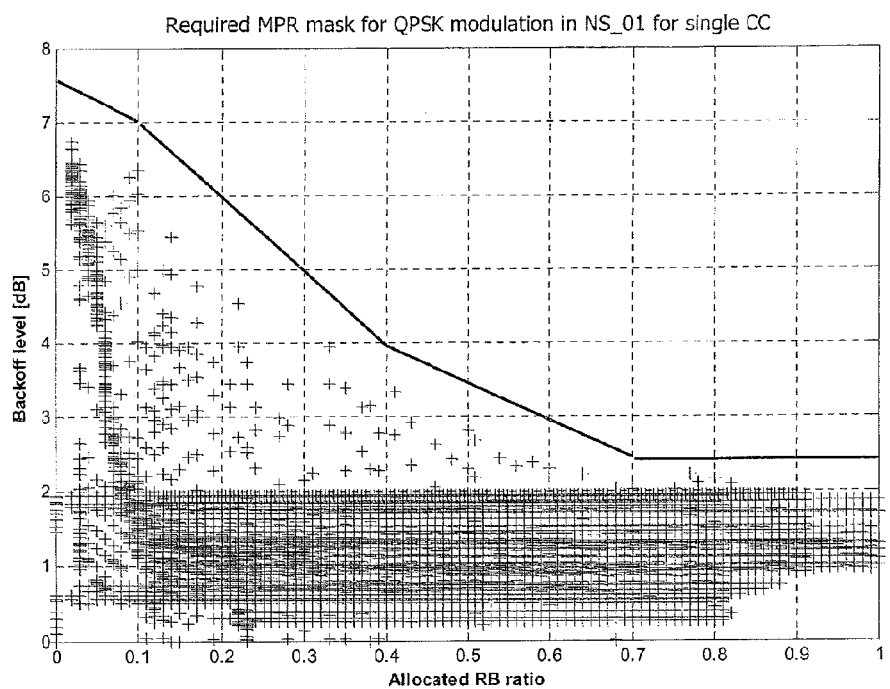
FIGS. 15A to 15D illustrate simulations respectively obtained by using quadrature phase-shift keying (QPSK) and 16-quadrature amplitude modulation (QAM), and illustrate maximum power reductions (MPRs) according to the simulations.

Referring to FIG. 15A, there is shown a simulation result when multiple clusters are simultaneously transmitted using a QPSK modulation scheme under the situation of a single component carrier. Specifically, when the allocation ratio is within a range from 0 to 0.1, the MPR of a maximum of about 7.6 dB is required. As such, the MPR according to the simulation result of FIG. 15A can be defined as NS_01 if QPSK modulation is used.

Figure 15B:
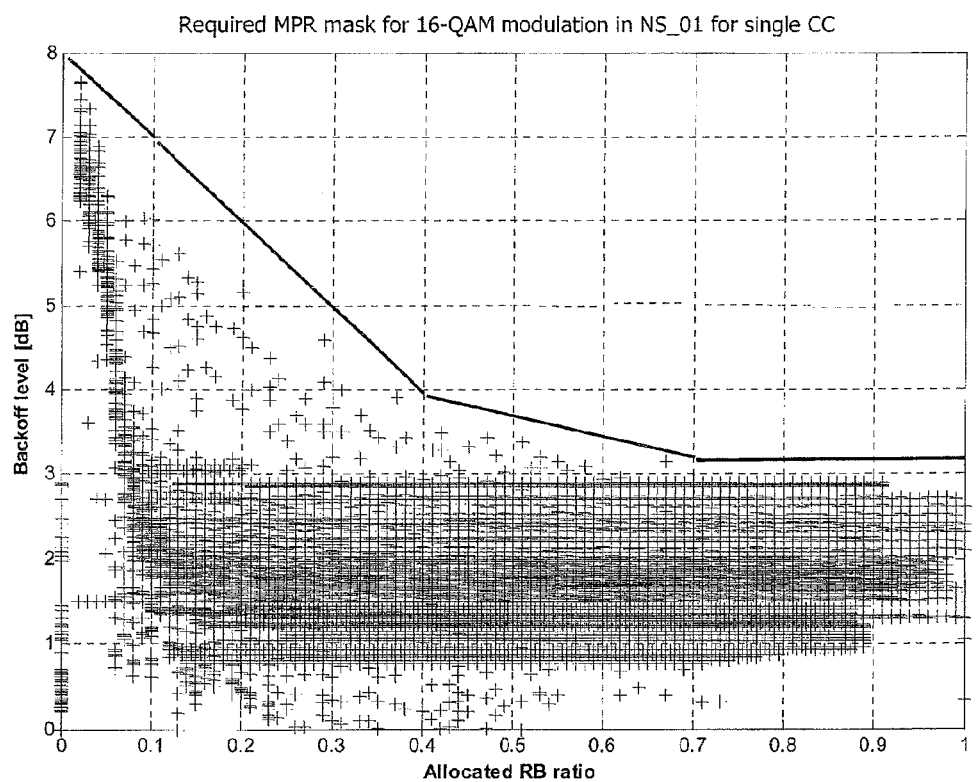

Referring to FIG. 15B, there is shown a simulation result when multiple clusters are simultaneously transmitted using a 16-QAM modulation scheme under the situation of a single component carrier. According to the simulation result, when the allocation ratio is within a range from 0 to 0.1, the MPR of a maximum of about 8 dB is required. The MPR according to the simulation result of FIG. 15B is defined as NS_01 if 16QAM modulation is used. However, in order to consider results of QPSK, the MPR according to the simulation result of FIG. 15B can be defined as NS_01.

The MPR required to reduce the ACLR, SEM and SE has be derived from the simulation results shown in FIGS. 15A and 15B. In a case where the signaling is performed as the NS_01, the terminal must apply other values of MPR according to the allocation ratio. The values of MPR according to the allocation ratio are defined as shown in the following table.

Table 8 shows values of MPR, required when multiple clusters are simultaneously transmitted using the single component carrier in a case where the signaling is performed from the BS to the terminal as the NS_01.

TABLE 8

| A = $N_{RB\_alloc}/N_{RB\_agg}$ | 0 | 0.1 | 0.4 | 0.7 | 1 |
|---|---|---|---|---|---|
| Mask Limit (dB) | 8.0 | 7.0 | 4.0 | 3.3 | 3.3 |

MPR=(8.0−10*A) dB, 0<A≤0.1
=(8.0−10*A) dB, 0.1<A=0.4
=(4.96−2.33*A) dB, 0.4<A=0.7
=3.3 dB, 0.7<A=1.0

Here, the $N_{RB\_agg}$ denotes the number of RBs aggregated in the aggregation channel band. The $N_{RB\_alloc}$ denotes the total number of RBs simultaneously transmitted in the configuration of the aggregation channel band. Alternately, the $N_{RB\_alloc}$ denotes the sum of activated RBs, although it is not indicated that all clusters are considered.

Figure 15C:
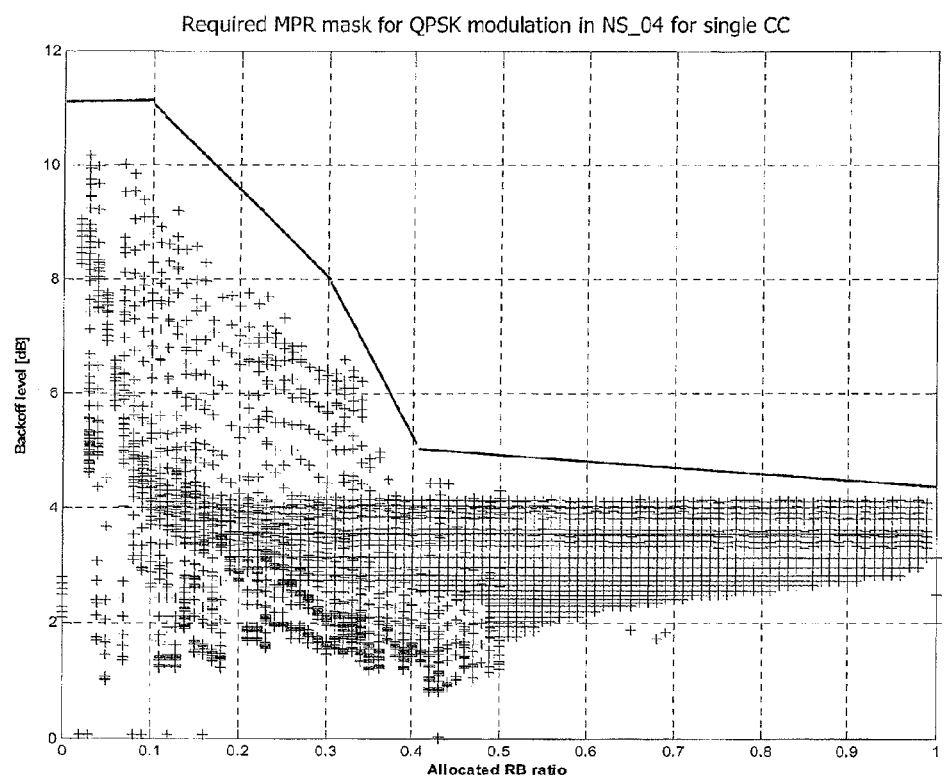

Referring to FIG. 15C, there is shown a simulation result when multiple clusters are simultaneously transmitted by using the QPSK modulation scheme under the situation of the single component carrier and by considering additional SE/SEM of NS_04. According to the simulation result, when the allocation ratio is within a range from 0 to 0.1, the MPR of a maximum of about 11.2 dB is required. As such, the MPR according to the simulation result of FIG. 15C can be defined as a value for NS_04 if QPSK modulation is used.

Figure 15D:
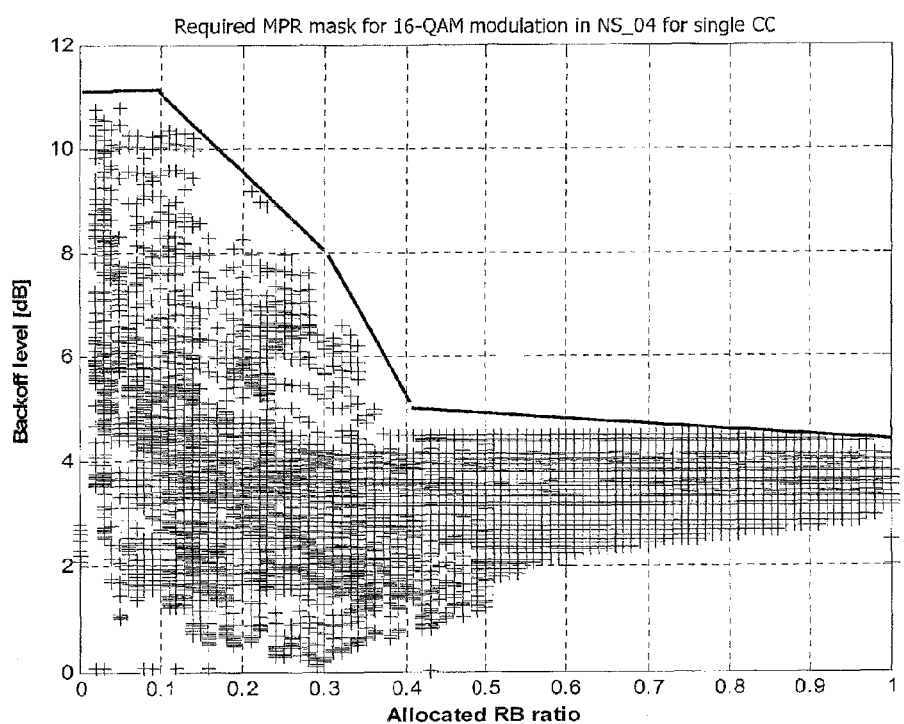

Referring to FIG. 15D, there is shown a simulation result when multiple clusters are simultaneously transmitted using the 16-QAM modulation scheme under the situation of the single component carrier. According to the simulation result, when the allocation ratio is within a range from 0 to 0.1, the MPR of a maximum of about 11.2 dB is required. As such, the MPR according to the simulation result of FIG. 15D can be defined as NS_04 if 16QAM modulation is used. However, in order to consider results of QPSK, the MPR according to the simulation result of FIG. 15D can be defined as NS_0.

As can be seen from the simulation results shown in FIGS. 15C and 15D, the terminal must apply other values of MPR according to the allocation ratio.

Figure 16:
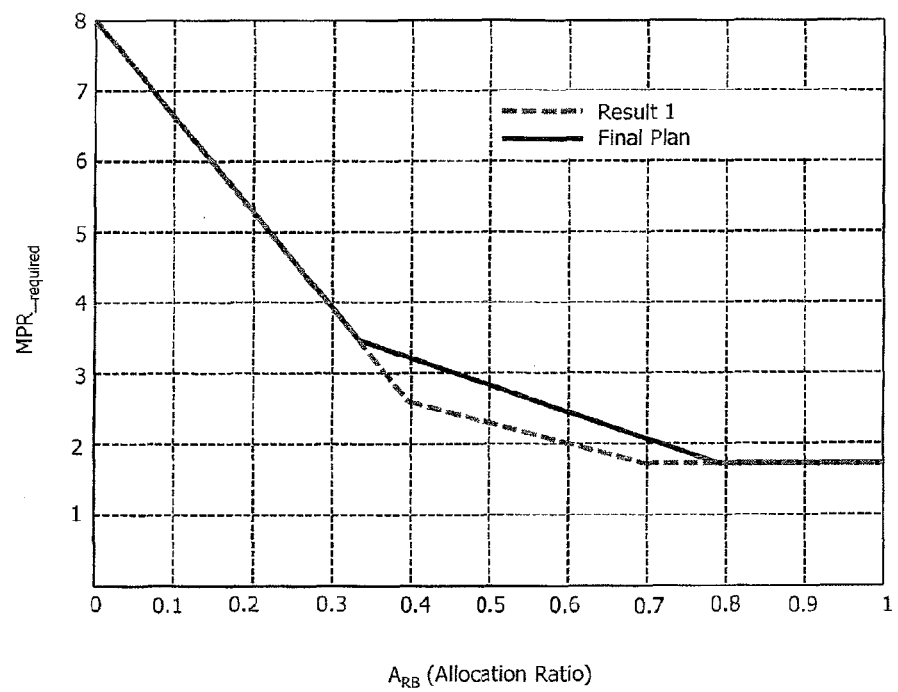
FIG. 16 illustrates MPRs according to simulation results, when multiple clusters are simultaneously transmitted through a single component carrier.

FIG. 16 illustrates MPRs according to simulation results, when multiple clusters are simultaneously transmitted through a single component carrier.

Unlike FIG. 15, MPR required according to the allocation ratio $A_{RB}$ ($N_{RB\_alloc}/N_{RB\_agg}$) is shown in FIG. 16 by simultaneously considering the QPSK modulation scheme and the 16-QAM modulation scheme. Meanwhile, the value of MPR shown in FIG. 16 may be a value previously stored in the terminal. Therefore, when the band of the allocated UL resource is a general operating band that does not require the NS, the transmission power may be limited using the value of MPR previously stored in the terminal. Meanwhile, if a specific NS is received, the UE can limit a maximum transmission power according to A-MPR mask.

TABLE 9

| A = $N_{RB\_alloc}/N_{RB\_agg}$ | 0 | 0.1 | 0.4 | 0.7 | 1 |
|---|---|---|---|---|---|
| MPR Mask Limit (dB) | 8.0 | 7.0 | 4.0 | 3.3 | 3.3 |

MPR=(8.0−10*A) dB, 0<A≤0.1
=(8.0−10*A) dB, 0.1<A=0.4
=(4.96−2.33*A) dB, 0.4<A=0.7
=3.3 dB, 0.7<A=1.0

Upper table 9 is the required MPR mask from the simulation results for general enwanted emission as FIGS. 15A and 15B Each waveform includes two clusters in which RBs have various bandwidths and the same power spectrum density. The position and band of the RB are arbitrary. The MPR for each waveform is calculated in consideration of the general SEM, the ACLR and the general SE. That is, in a case where the UL resource allocated from the BS exists in the channel band 1401 for the E-UTRA, the value of MPR is calculated the UTRA$_{ACLR1}$ and UTRA$_{ACLR2}$ for the channel band for the E-UTRA and the two adjacent channels 1402 and 1403. In a case where the UL resource allocated from the BS exists in the channel band 1401 for the E-UTRA, the value of MPR is calculated in consideration of the E-UTRA$_{ACLR}$ for the adjacent channel 1404, i.e., the channel for the E-UTRA. The value of MPR is calculated in consideration of the general SE that a frequency must not interfere when the channel is distant by a certain frequency distance from the outside of a given channel band. The value of the MPR is calculated in consideration of the general SE that a frequency must not interfere according to the frequency range. Meanwhile, the result 1 may be modified like the final plan shown in FIG. 16. Hereinafter, the final plan will be described.

The MPR of the maximum output power for the transmission of multiple clusters, with respect to Class A in an intra-band contiguous CA band, is as follows. Alternatively, the MPR of the maximum output power for the transmission of multiple clusters in the single component carrier is as follows.

MPR=CEIL $\{M_A, 0.5\}$

Here, the CEIL $\{M_A, 0.5\}$ means a function of rounding off the MPR as a unit of 0.5 dB. That is, MPR∈{3.0, 3.5 4.0 4.5 5.0 5.5 6.0 6.5 7.0 7.5 8.0}.

MPR=(8.0−10.12*A) dB, 0<A≤0.33
=(5.67−3.07*A) dB, 0.33<A=0.77
=3.31 dB, 0.77<A=1.0

The value of MPR is calculated in consideration of SE.

The value of the MPR may be a value previously stored in the terminal, although it is not indicated through the NS performed from the BS. That is, when the UL resource allocated from the BS is a general operating band which does not requires the NS, the value of MPR previously stored in the terminal may be used.

The exemplary embodiments described above may be implemented using various means. For example, the exemplary embodiments may be implemented by hardware, firmware, software, or combination thereof According to the implementation using the hardware, the method according to the exemplary embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, etc.

According to the implementation using the firmware or software, the method according to the exemplary embodiments may be implemented in the form of a module, procedure or function performing functions and operations described above. Software codes may be stored in a memory unit and executed by a processor. The memory unit may be located in the inside or outside of the processor, and communicate data with the processor using various means known in the art.

Figure 17:
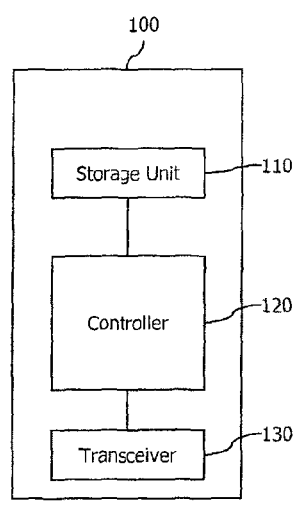
FIG. 17 is a configuration block diagram of a terminal according to an exemplary embodiment.

FIG. 17 is a configuration block diagram of a terminal 100 according to an exemplary embodiment.

As shown in FIG. 17, the terminal 100 includes a storage means 110, a controller 120 and a transceiver 130.

The storage means 110 stores the methods shown in FIGS. 10 to 16.

The controller 120 individually controls the storage means 110 and the transceiver 130. Specifically, the controller 120 performs the methods stored in the storage means 110. If the transceiver 130 receives RBs allocated to transmit multiple clusters using a single component carrier from the BS and receives an NS value, the controller 120 controls the transceiver 130 to transmit a signal by limiting the maximum transmit power according to the MPR indicated by the NS value.

The present invention may be applied to terminals, base stations or other equipments in a wireless mobile communication system.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of reducing transmission power, the method performed by a user equipment and comprising: calculating a maximum power reduction (MPR) on maximum output power for transmission with non-contiguous resource allocation in a single component carrier; and transmitting a signal based on the MPR, wherein the MPR is performed differently depending on a resource allocation ratio A, wherein the resource allocation ratio A is defined as a ratio between $N_{RB\_agg}$ and $N_{RB\_alloc}$, wherein the MPR is determined according to the following equation: MPR=CEIL $\{M_A, 0.5\}$, the CEIL being a function of rounding up by 0.5, and wherein the $M_A$ is determined according to the following equations:

$$M_A=(8.0-10.12*A)$$

when $$0<A\leq0.33,$$

$$M_A=(5.67-3.07*A)$$

when $$0.33<A\leq0.77,$$

and $$M_A=(3.31)$$

when $$0.77<A\leq1.0,$$

the A being a ratio of a number of simultaneously transmitted resource blocks in a channel bandwidth ($N_{RB\_alloc}$) to a number of aggregated resource blocks in a fully allocated aggregated channel bandwidth ($N_{RB\_agg}$).

2. The method of claim 1, further comprising: receiving information on an uplink resource allocated by a base station.

3. The method of claim 1, further comprising: receiving system information from a base station.

4. The method of claim 3, wherein the system information includes information on an operating band.

5. The method of claim 3, wherein the system information includes information on an uplink bandwidth.

6. The method of claim 3, wherein the system information includes information on an uplink carrier frequency.

7. The method of claim 5, wherein the information on the uplink bandwidth is expressed in units of resource blocks.

8. A terminal for transmitting a signal with reduced transmission power, the terminal comprising: a transceiver configured to transceive the signal; and a controller configured to: calculate a maximum power reduction (MPR) on maximum output power for transmission with non-contiguous resource allocation in a single component carrier; and transmit the signal based on the MPR, wherein the MPR is performed differently depending on a resource allocation ratio A, wherein the resource allocation ratio A is defined as a ratio between $N_{RB\_agg}$ and $N_{RB\_alloc}$, wherein the MPR is determined according to the following equation: MPR=CEIL $\{M_A, 0.5\}$, the CEIL being a function of rounding up by 0.5, and wherein the $M_A$ is determined according to the following equations:

$$M_A = (8.0 - 10.12*A)$$

when $$0 < A \leq 0.33,$$

$$M_A = (5.67 - 3.07*A)$$

when $$0.33 < A \leq 0.77,$$

and $$M_A = (3.31)$$

when $$0.77 < A \leq 1.0,$$

the A being a ratio of a number of simultaneously transmitted resource blocks in a channel bandwidth ($N_{RB\_alloc}$) to a number of aggregated resource blocks in a fully allocated aggregated channel bandwidth ($N_{RB\_agg}$).

9. The terminal of claim 8, wherein the controller is further configured to receive information on an uplink resource allocated by a base station.

10. The terminal of claim 8, wherein the controller is further configured to receive system information from a base station.

11. The terminal of claim 10, wherein the system information includes information on an operating band.

12. The terminal of claim 10, wherein the system information includes information on an uplink bandwidth.

13. The terminal of claim 10, wherein the system information includes information on an uplink carrier frequency.

14. The terminal of claim 12, wherein the information on the uplink bandwidth is expressed in units of resource blocks.

* * * * *

UNITED STATES PATENT AND TRADEMARK OFFICE
CERTIFICATE OF CORRECTION

PATENT NO. : 9,014,133 B2
APPLICATION NO. : 14/527619
DATED : April 21, 2015
INVENTOR(S) : Suhwan Lim et al.

Page 1 of 1

It is certified that error appears in the above-identified patent and that said Letters Patent is hereby corrected as shown below:

ON THE TITLE PAGE:

At item (73), Assignee, change "LG Electronics, Seoul (KR)" to --LG Electronics Inc., Seoul (KR)--.

Signed and Sealed this
Tenth Day of November, 2015

Michelle K. Lee
*Director of the United States Patent and Trademark Office*